US012712918B2

(12) United States Patent
Hay et al.

(10) Patent No.: US 12,712,918 B2
(45) Date of Patent: Aug. 18, 2026

(54) SYSTEMS AND METHODS FOR EVALUATING AN ELECTRONIC COMMUNICATION

(71) Applicant: Wells Fargo Bank, N.A., San Francisco, CA (US)

(72) Inventors: Kelvin Hay, Hattiesburg, MS (US); Kathryn Lynne Sanders, Charlotte, NC (US); Angela Melita Maryland, McLean, VA (US); Leo Rinaldi, Matthews, NC (US); Abe Akhimiomoh, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 27 days.

(21) Appl. No.: 18/648,039

(22) Filed: Apr. 26, 2024

(65) Prior Publication Data

US 2025/0337785 A1 Oct. 30, 2025

(51) Int. Cl.
*H04L 9/40* (2022.01)
*H04L 51/063* (2022.01)

(52) U.S. Cl.
CPC ............ *H04L 63/20* (2013.01); *H04L 51/063* (2013.01)

(58) Field of Classification Search
CPC .... G06F 21/6245; G06F 40/30; G06F 40/287; H04L 51/063; H04L 63/20; H04L 51/212
See application file for complete search history.

(56) References Cited

U.S. PATENT DOCUMENTS

2006/0047649 A1* 3/2006 Liang .................... G06F 16/338
2014/0188921 A1* 7/2014 Thomason ............ G06F 40/289 707/758
2019/0297042 A1* 9/2019 Prabhu .................. H04L 51/212
2020/0267104 A1 8/2020 Stuntebeck
2020/0366712 A1* 11/2020 Onut ................... H04L 63/1483
2020/0396190 A1* 12/2020 Pickman ............... H04L 67/306
2021/0073673 A1 3/2021 Janakiraman
2023/0096474 A1* 3/2023 Krishnan ............. G06N 3/0464 726/26
2023/0112740 A1 4/2023 Alqaderi
2023/0267285 A1* 8/2023 Wu ....................... G06F 40/166 704/2

* cited by examiner

*Primary Examiner* — Tom Y Chang
(74) *Attorney, Agent, or Firm* — K&L Gates LLP

(57) ABSTRACT

Systems, apparatuses, methods, and computer program products are disclosed for evaluating an electronic communication. An example method includes receiving an electronic communication and generating, a plurality of tokens based on the plurality of characters. The example method further includes determining whether the electronic communication includes disallowed content based on the plurality of tokens using a contextual analysis machine learning model and in an instance in which the electronic communication is determined to include disallowed content, determining, an infraction event using the contextual analysis machine learning model. The example method further includes determining an infraction alleviation action based on the infraction event type and causing performance of the infraction alleviation action.

20 Claims, 6 Drawing Sheets

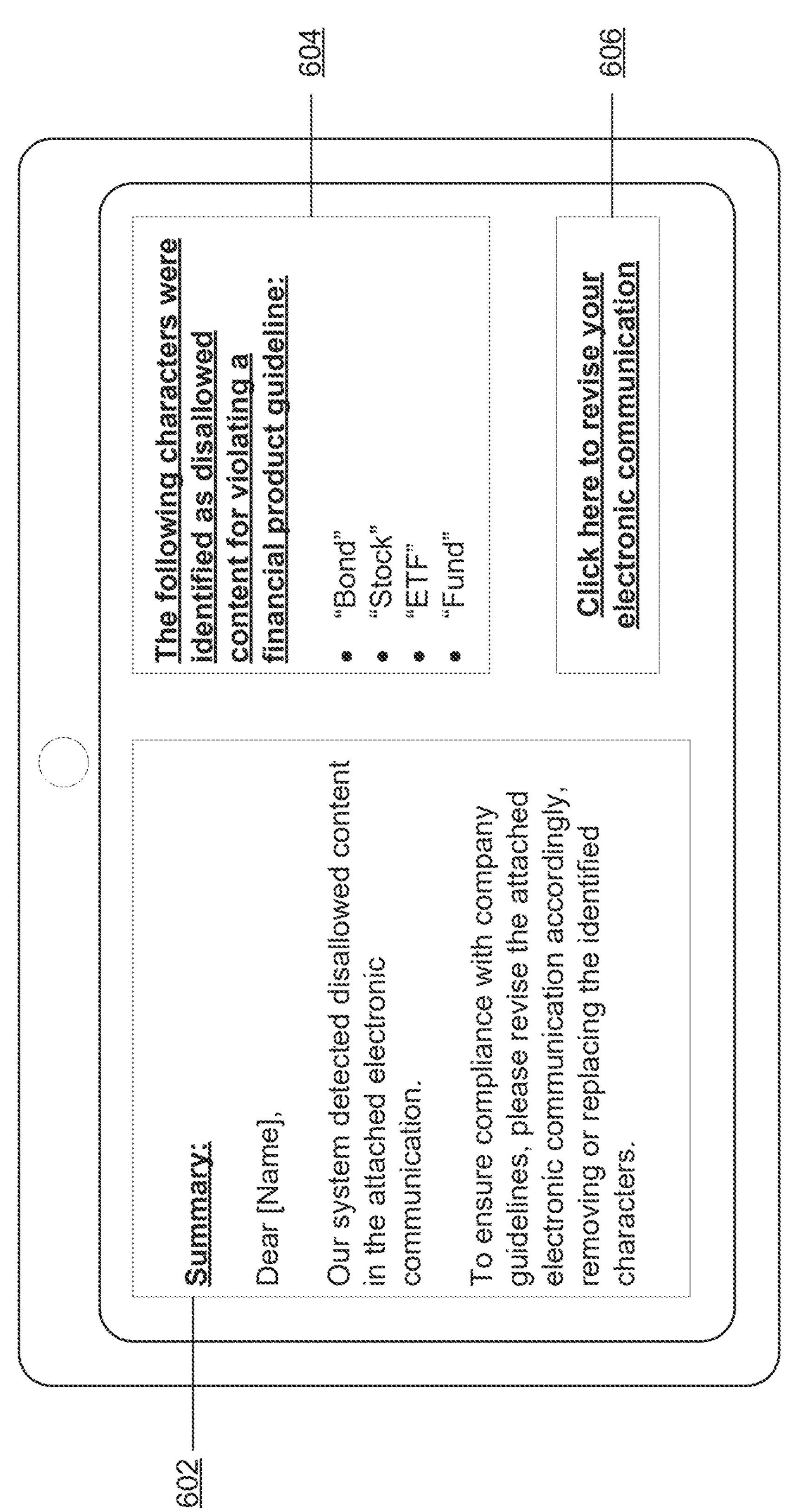
FIG. 6
602
604
606
Summary:
Dear [Name],
Our system detected disallowed content in the attached electronic communication.
To ensure compliance with company guidelines, please revise the attached electronic communication accordingly, removing or replacing the identified characters.
The following characters were identified as disallowed content for violating a financial product guideline:
• "Bond"
• "Stock"
• "ETF"
• "Fund"
Click here to revise your electronic communication

SYSTEMS AND METHODS FOR EVALUATING AN ELECTRONIC COMMUNICATION

BACKGROUND

Electronic communications are often subject to monitoring to ensure compliance to established rules (e.g., policies and guidelines). Compliance of electronic communications traditionally involves monitoring for certain keywords or terms. However, these traditional approaches employ static rules-based techniques that result in various issues and shortcomings.

BRIEF SUMMARY

Electronic communications (e.g., emails, chat messages, social media posts, or the like) have provided great benefits that enable quick and efficient communication between two or more parties. As such, electronic communications are now ubiquitous in society, and therefore it is necessary for entities in all industries to transmit and receive electronic communications both internally (e.g., an employee-to-employee interaction) and externally (e.g., an employee-to-customer interaction). However, a heavy reliance on electronic communications may expose an entity to unique risks, given that an author of an electronic communication may advertently or inadvertently include disallowed content (e.g., prohibited terminology, personal opinions, confidential information, instructions to direct the user to a non-monitored line of communication, and/or any other information that may expose an entity or one or more individuals to risks) in an electronic communication that can be distributed near instantaneously to one or more recipients. In this regard, thoughtful electronic communication evaluation techniques are required to ensure that an electronic communication does not include disallowed content.

Traditionally, entities may utilize a rules-based electronic communication evaluation technique to determine whether electronic communications include disallowed content. In particular, a rules-based model may be utilized to determine whether an electronic communication includes disallowed content. For instance, a rules-based model may rely on a set of predefined criteria (e.g., a list of prohibited terminology) to determine whether an electronic communication includes disallowed content. For example, assume a rules-based model relies upon a list of prohibited terminology that includes terms associated with or terms that define financial instruments, such as a stock, bond, exchange-traded fund (ETF), or the like. As a result, if an electronic communication includes the word "bond", the rules-based model may determine that the electronic communication includes prohibited terminology and thus includes disallowed content.

While a rules-based electronic communication evaluation technique may detect if an electronic communication includes a disallowed word or term, rules-based electronic communication evaluation techniques have blind spots that limit their capabilities. In particular, since rules-based models merely rely upon predefined rules, they often do not efficiently or at all consider context-specific nuances, and thus may frequently produce false-positives. Continuing the above example where a rules-based model determined that an electronic communication included disallowed content because the electronic communication included the word "bond", the rules-based model is unaware of the context for the word "bond." As such, in the above example, the rules-based model would appropriately flag the electronic communication if "bond" was used to describe a financial instrument, but the rules-based model would inappropriately flag the electronic communication if the word "Bond" was the customer's last name and was used to greet the said customer.

To correct the false-positives frequently produced by rules-based models, entities may rely upon a trusted third party (e.g., a human evaluator) to manually review any word/term included in an electronic communication that was identified by the rules-based model as disallowed terminology. However, manual reviews of electronic communications are time and cost intensive and for entities that transmit large amounts of electronic communications, manually reviewing each electronic communication that may potentially include disallowed terminology is generally impossible. Moreover, the time required to manually review electronic communication prohibits the ability to provide any type of real-time feedback to the author of the evaluated electronic communication. In addition, manually evaluating a large volume of electronic communications would likely require multiple evaluators, each of whom may interpret the content included in the electronic communications differently and thus draw different conclusions as to what may be considered allowed or disallowed content.

The inherent blind spots and limitations associated with rules-based and manual electronic communication evaluation techniques present a technical problem. As such, a need exists for a real-time solution that efficiently and objectively evaluates an electronic communication for disallowed content by considering the full context of the content included in an electronic communication. Example embodiments provide a technical solution to this technical problem because example embodiments do not require manual intervention. Further, by leveraging a trained contextual analysis machine learning model to determine the context of an electronic communication, example embodiments provide a technical solution ensuring the efficient and objective determination of the presence of disallowed content included in an electronic communication in a context-aware manner and in real-time. By leveraging machine learning and/or deep learning techniques through the use of the contextual analysis machine learning model, embodiments described herein may evaluate electronic communications in a context-aware manner and thereby, reducing the false-positive rate for said electronic communications. Furthermore, the contextual analysis machine learning model evaluates the context of the electronic communication such that if users attempt to outsmart or otherwise circumvent traditional rules-based model (e.g., by intentionally misspelling keywords or phrases, using an alternative term, or the like), the contextual analysis machine learning model may still be able to determine whether these alternate terms or phrases are disallowed.

Example embodiments described herein mitigate the above concerns by creating and using a centralized system that leverages a contextual analysis machine learning model that considers the semantic meaning of terminology, phrases, and/or other content in an electronic communication to ultimately determine whether the electronic communication includes disallowed content. To do so, some example embodiments may receive an electronic communication that comprises a body that includes a plurality of characters. The body may refer to the main content or message that is conveyed in the electronic communication. The plurality of characters may include alphanumeric characters (e.g., letters and numbers), punctuation marks, symbols, white spaces, and/or the like. Example embodiments may then generate, based on the plurality of characters, a plurality of tokens. In some embodiments, the system may leverage a variety of different tokenization algorithms to generate the plurality of tokens.

Example embodiments may also use the contextual analysis machine learning model to determine whether an electronic communication includes disallowed content. In some embodiments, the contextual analysis machine learning model may be configured to generate a plurality of tokens representative of the electronic communication and determine whether the electronic communication includes disallowed content based on the plurality of tokens. In particular, in some embodiments, a token of the plurality of tokens may be evaluated to determine if it corresponds to disallowed content. The disallowed content may include any content that an entity may determine to be prohibited to be included in an electronic communication, such as personal identifiable information (PII), prohibited terminology, personal opinions, confidential information, instructions to direct the user to a non-monitored line of communication, and/or any other content that may expose an entity or one or more individuals to risk (e.g., security risks associated with exposing PII). In some embodiments, the contextual analysis machine learning model may be trained to identify disallowed content included in electronic communications by training using a plurality of annotated electronic communications. Each annotated electronic communication may include an indication of whether an annotated electronic communication includes disallowed content. In addition, if the annotated electronic communication includes disallowed content, the annotated electronic communication may further include (i) an indication of one or more characters within the body of the annotated electronic communication that corresponds to the disallowed content and (ii) a rule (e.g., a rule indicating the PII is prohibited in electronic communication) associated with the disallowed content.

If a token included in the plurality of tokens corresponds to disallowed content, example embodiments may also leverage the contextual analysis machine learning model to determine an infraction event. In some embodiments, the infraction event may correspond to an infraction event type (e.g., a high security infraction event, a low security infraction event, or the like), which is based on the disallowed content that the token corresponds to. Example embodiments may also determine an infraction alleviation action associated with the infraction event type. The infraction alleviation action may refer to a real-world operation (e.g., notifying the author of the electronic communication that the electronic communication caused the determination of an infraction event and requesting a, updated word/term that may replace the plurality of characters associated with disallowed content) that may mitigate the risk associated with the disallowed content. Example embodiments, may also cause the performance of the infraction alleviation action (e.g., transmitting a notification to a computing device associated with the user that authored the electronic communication). In some embodiments the infraction alleviation action may request that the user associated with the user device transmits a replacement word/term to alleviate and ultimately cause removal of the determined infraction event. Alternatively, the transmitted replacement word may not cause removal of the infraction event if the transmitted word corresponds to disallowed content. As a result, the infraction event may be maintained until the determined token of the electronic correspondence does not correspond to disallowed content. Thus, the contextual analysis machine learning model may be leveraged to determine the infraction event of an infraction event type and responsive infraction alleviation actions may be performed. The particular infraction alleviation actions are variable amongst the different infraction event types, thereby providing flexibility for differing degrees of infractions. Thus, this flexible variability is contemplative that different infractions exist and allows for different responses (e.g., infraction alleviation actions) to be performed for a given infraction event.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 6 illustrates an example user interface used in some example embodiments described herein.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
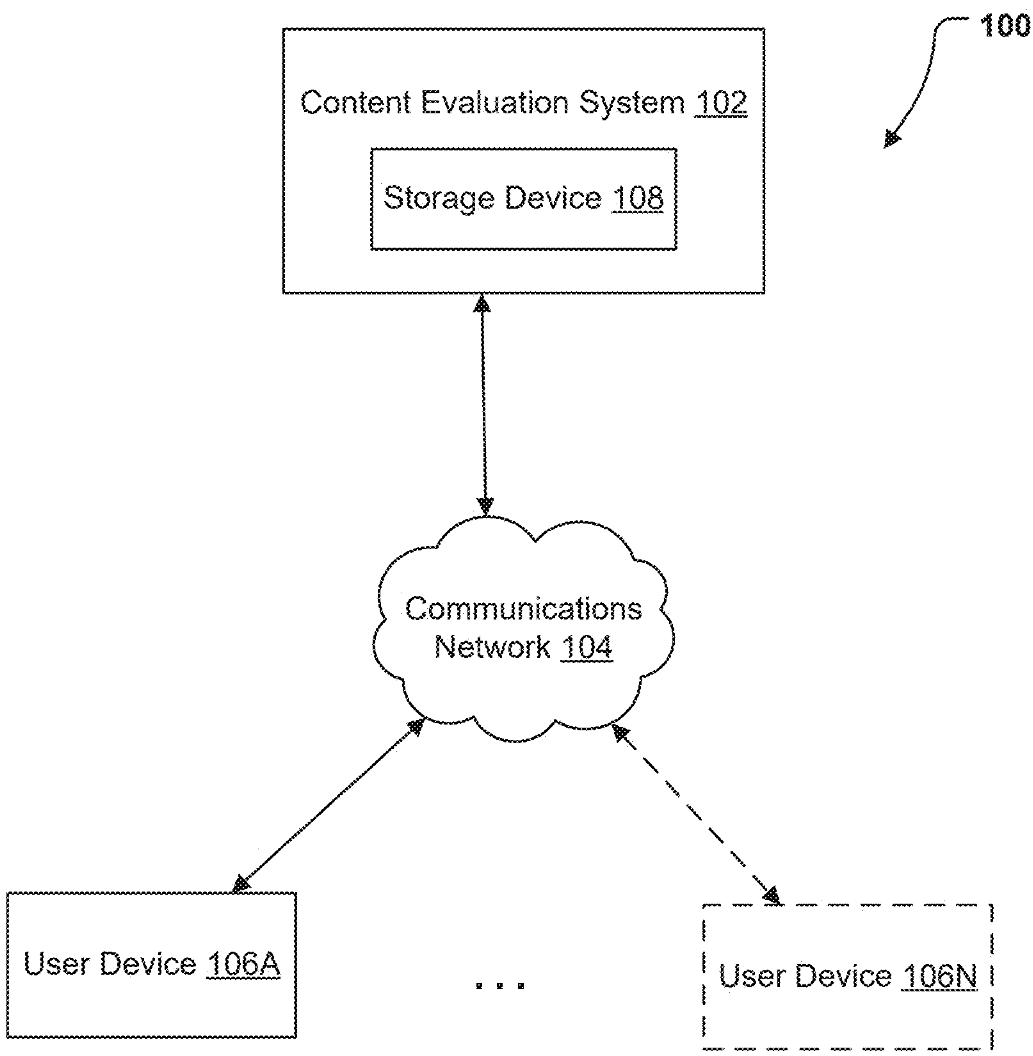
FIG. 1 illustrates a system in which some example embodiments may be used.

Example embodiments described herein may be implemented using any of a variety of computing devices or servers. To this end, FIG. 1 illustrates an example environment 100 within which various embodiments may operate. As illustrated, a content evaluation system 102 may receive and/or transmit information via communications network 104 (e.g., the Internet) with any number of other devices, such as one or more of user devices 106A-106N.

The content evaluation system 102 may be implemented as one or more computing devices or servers, which may be composed of a series of components. Particular components of the content evaluation system 102 are described in greater detail below with reference to apparatus 200 in connection with FIG. 2.

In some embodiments, the content evaluation system 102 further includes a storage device 108 that comprises a distinct component from other components of the content evaluation system 102. Storage device 108 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Storage device 108 may host the software executed to operate the content evaluation system 102. Storage device 108 may store information relied upon during operation of the content evaluation system 102, such as various algorithms that may be used by the content evaluation system 102, data and documents to be analyzed using the content evaluation system 102, or the like. In addition, storage device 108 may store control signals, device characteristics, and access credentials enabling interaction between the content evaluation system 102 and one or more of the user devices 106A-106N.

The one or more user devices 106A-106N may be embodied by any computing devices known in the art, such as desktop or laptop computers, smartphones, smart devices, or the like. The one or more user devices may be associated with a particular individual and/or an entity. The one or more user devices 106A-106N need not themselves be independent devices, but may be peripheral devices communicatively coupled to other computing devices.

Example Implementing Apparatuses

Figure 2:
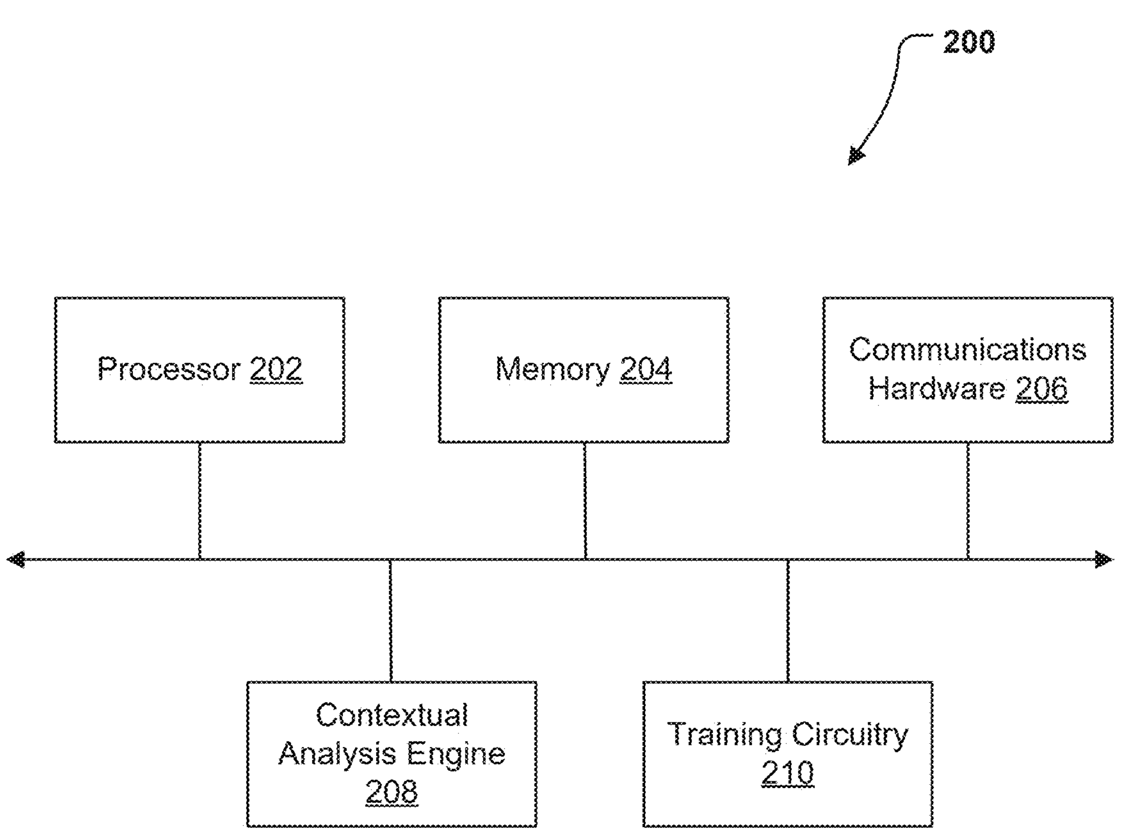
FIG. 2 illustrates a schematic block diagram of example circuitry embodying a system device that may perform various operations in accordance with some example embodiments described herein.

The content evaluation system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-5. As illustrated in FIG. 2, the apparatus 200 may include processor 202, memory 204, communications hardware 206, contextual analysis engine 208 and training circuitry 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a contextual analysis engine 208 that generates a plurality of tokens. Contextual analysis engine 208 may leverage a variety of different tokenizing algorithms to generate the plurality of tokens. Alternatively, the contextual analysis engine 208 may leverage the contextual analysis machine learning model to generate the plurality of tokens. In addition, the contextual analysis engine 208 may leverage a contextual analysis machine learning model to determine whether an electronic communication includes disallowed content, and in an instance in which the electronic communication is determined to correspond to disallowed content, the contextual analysis engine 208 determines an infraction event and an infraction event type that is associated with the infraction event. Further, the contextual analysis engine 208 determines, based on the infraction event, an infraction alleviation action and subsequently causes performance of the infraction alleviation action. The contextual analysis engine 208 may utilize processor 202, memory 204, or any other hardware component included in the apparatus 200 to perform these operations, as described in connection with FIGS. 3-5 below. The contextual analysis engine 208 may further utilize communications hardware 206 to gather data from a variety of sources (e.g., user devices 106A through user devices 106N or storage device 108, as shown in FIG. 1), and/or exchange data with a user, and in some embodiments may utilize processor 202 and/or memory 204.

In addition, the apparatus 200 further comprises a training circuitry 210 that trains the contextual analysis machine learning model using a plurality of annotated electronic communications. The training circuitry 210 may utilize processor 202, memory 204, or any other hardware component included in the apparatus 200 to perform these operations, as described in connection with FIG. 3 below. The training circuitry 210 may further utilize communications hardware 206 to gather data from a variety of sources (e.g., user devices 106A-106N or storage device 108, as shown in FIG. 1), and/or exchange data with a user, and in some embodiments may utilize processor 202 and/or memory 204.

Although components 202-210 are described in part using functional language, it will be understood that the particular implementations necessarily include the use of particular hardware. It should also be understood that certain of these components 202-210 may include similar or common hardware. For example, the contextual analysis engine 208 and training circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the contextual analysis engine 208 and training circuitry 210 may leverage processor 202, memory 204, or communications hardware 206 as described above, it will be understood that any of contextual analysis engine 208 and training circuitry 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that contextual analysis engine 208 and training circuitry 210 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of flowcharts and a graphical user interface.

Example Operations

Figure 3:
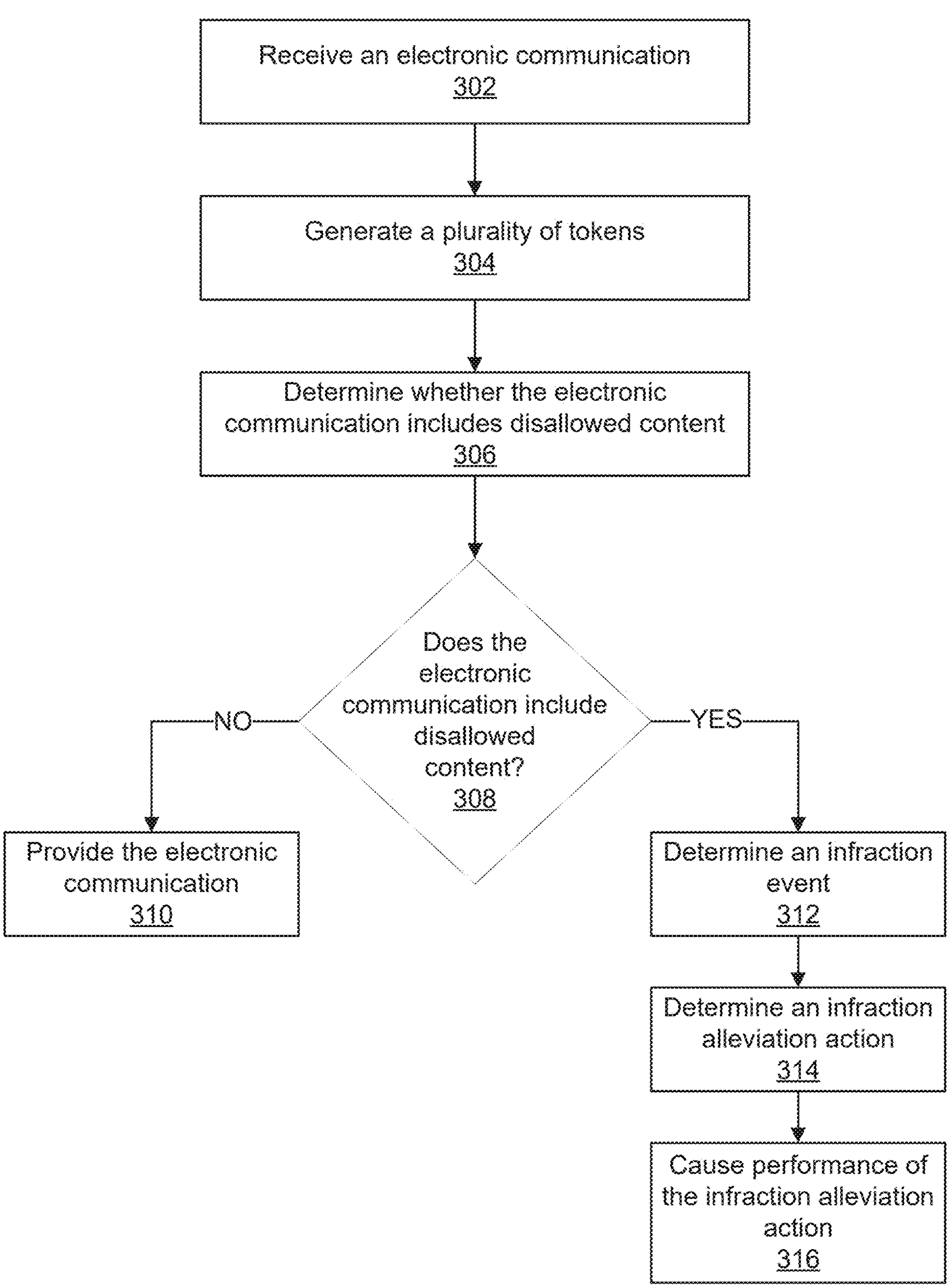
FIG. 3 illustrates an example flowchart for evaluating an electronic communication, in accordance with some example embodiments described herein.
Figure 4:
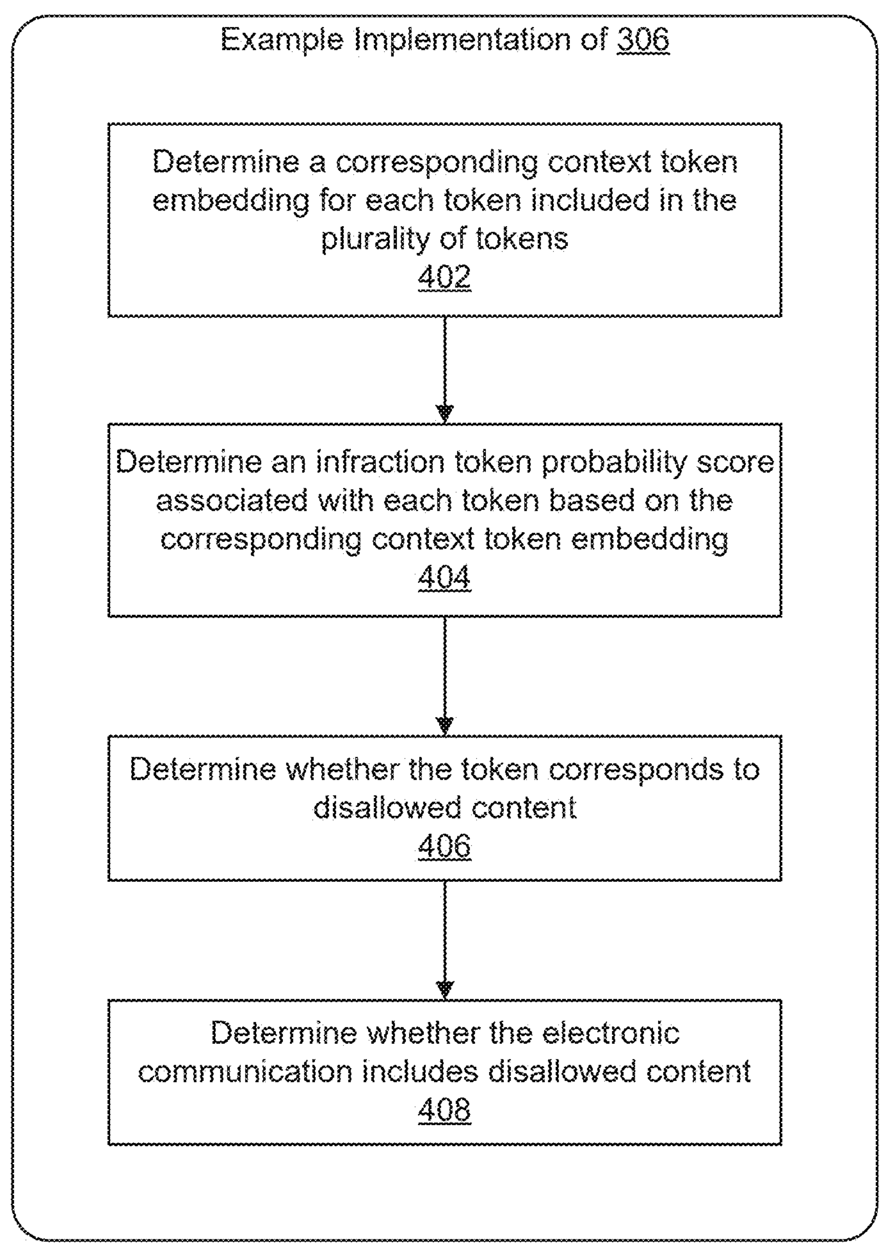
FIG. 4 illustrates an example flowchart for determining whether the electronic communication includes disallowed content, in accordance with some example embodiments described herein.
Figure 5:
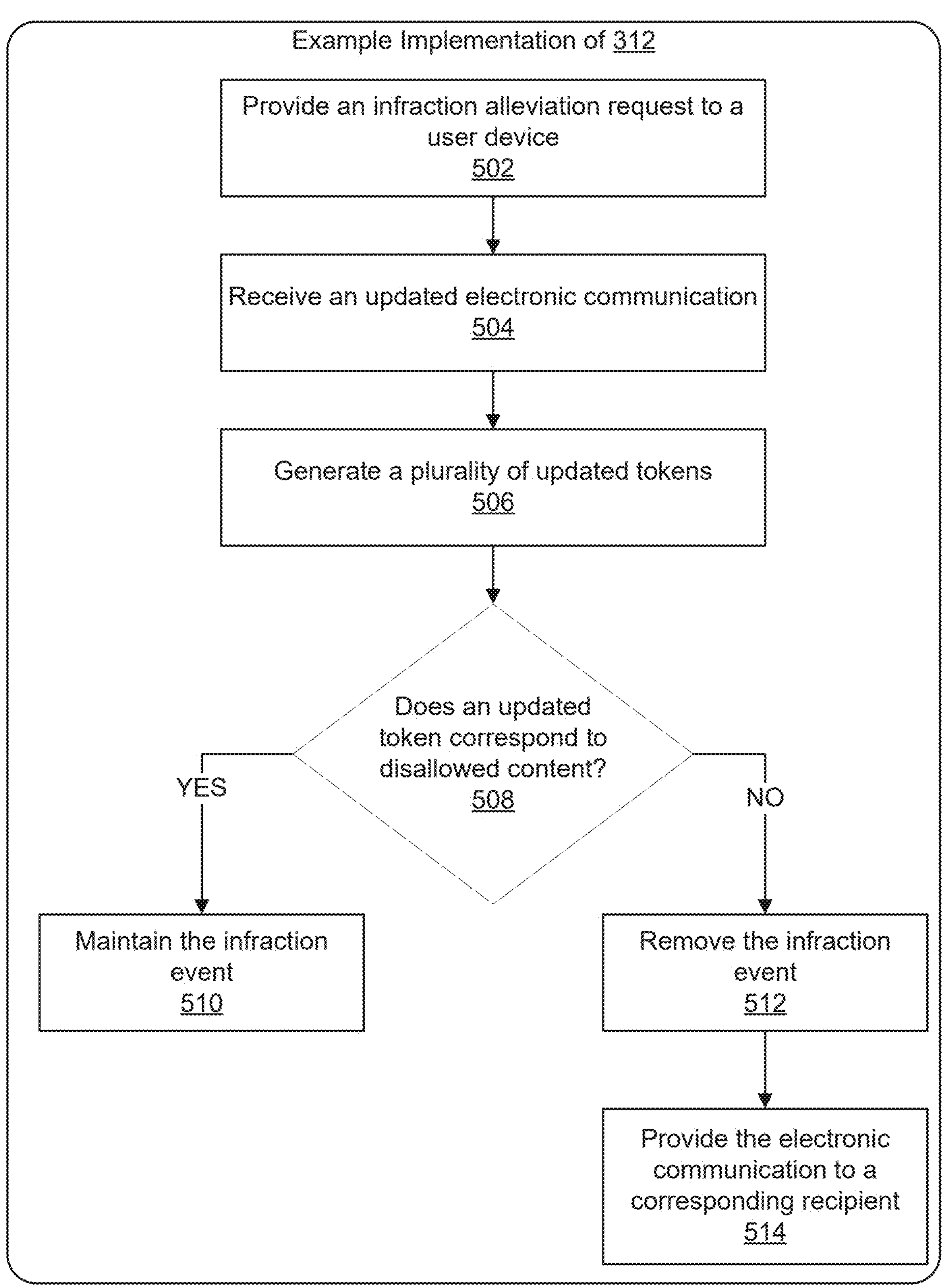
FIG. 5 illustrates an example flowchart for causing performance of the infraction alleviation action, in accordance with some example embodiments described herein.

Turning to FIGS. 3-5, example flowcharts are illustrated that contain example operations implemented by example embodiments described herein. The operations illustrated in FIGS. 3-5 may, for example, be performed by the content evaluation system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, contextual analysis engine 208, training circuitry 210, and/or any combination thereof. It will be understood that user interaction with the content evaluation system 102 may occur directly via communications hardware 206 or may instead be facilitated by a separate user device 106A, as shown in FIG. 1, and which may have similar or equivalent physical componentry facilitating such user interaction.

Turning first to FIG. 3, example operations are shown for evaluating an electronic communication.

As shown by operation 302, the apparatus 200 includes means, such as processor 202, memory 204, communications hardware 206, contextual analysis engine 208, or the like, for receiving an electronic communication. An electronic communication may refer to any type of digital communication that is received and/or transmitted via computing devices. For example, an email, instant message, social media post, or the like, may be considered an electronic communication. In particular, the electronic communication comprises a body that includes the main content of the electronic communication. For example, the body of an email may refer to the portion of the email where the author (e.g., a user) writes the main text of the message. As such, the body comprises a plurality of characters. For example, the plurality of characters may include one or more of alphanumeric characters (letters and/or numbers), punctuation marks, symbols, white spaces, and/or the like.

In some embodiments, the electronic communication may be received by the apparatus 200 (e.g., communications hardware 206) from a computing device associated with the user (e.g., any one of user devices 106A-106N, and/or the like) via a network (e.g., communications network 104, shown in FIG. 1). In some embodiments, communications hardware 206 may store the received electronic communication in a local storage device (e.g., memory 204, storage device 108, or the like). Additionally or alternatively, communications hardware 206 may transmit the received electronic communication to contextual analysis engine 208, such that contextual analysis engine 208 may evaluate the received electronic communication.

In some embodiments, communications hardware 206 may receive the electronic communication in response to the occurrence of an automatic trigger event. An automatic trigger event may include a circumstantial trigger event, a temporal trigger event, or the like. A circumstantial trigger event may take place based on rules and/or configurations predefined by an entity (e.g., an entity that is evaluating the electronic communication transmitted by their employees) or an individual (e.g., a manager of one or more employees) that requires a computing device associated with a user (e.g., user device 106A, user device 106N, or the like) to transmit the electronic communication from the computing device associated with the user to the apparatus 200 (e.g., communications hardware 206). For example, contextual analysis engine 208 may configure a circumstantial trigger that causes a computing device associated with a user to transmit an electronic communication to the apparatus 200 if the intended recipient of the electronic communication is not associated with the same entity as the user that is transmitting the electronic communication (e.g., an employee-to-customer interaction).

A temporal trigger event, may take place based on rules and/or configurations predefined by an entity (e.g., a financial institution that is providing the content evaluation) or an individual (e.g., a manager) that requires a computing device associated with a user (e.g., user device 106A, user device 106N, or the like) to transmit the electronic communication from a computing device associated with a user to the apparatus 200 (e.g., communications hardware 206) within a particular time period or at a particular point in time. For example, contextual analysis engine 208 may configure a temporal trigger that causes a periodic (e.g., monthly) audit of outgoing electronic communication associated with a particular user device, such that all electronic communication transmitted from a particular user device (e.g., user device 106A) on a randomly selected day each month is transmitted to communications hardware 206 via a network (e.g., communications network 104, shown in FIG. 1).

In some embodiments, communications hardware 206 may obtain access (e.g., via an API) to a digital platform associated with outgoing electronic communications, such as an email server, instant messaging (IM) platform, and/or the like. In this regard, communications hardware 206 may access data stored on the digital platform and thus retrieve an outgoing electronic communication before the electronic communication is transmitted, such as while the electronic communication is being composed. In some embodiments, communications hardware 206 may configure an API hook associated with a particular digital platform (e.g., an email service provider), such that the apparatus 200 may intercept and receive electronic communication in real-time from the particular digital platform. For example, communications hardware 206 may configure an API hook that causes communications hardware 206 to receive an electronic notification if a particular event occurs (e.g., the transmission of an electronic communication).

As shown by operation 304, the apparatus 200 includes means, such as processor 202, memory 204, contextual analysis engine 208, or the like, for generating a plurality of tokens. The plurality of tokens may be generated based on the plurality of characters included in the body of the received electronic communication. In some embodiments, contextual analysis engine 208 may select a tokenization algorithm from a plurality of tokenization algorithms (e.g., tokenization algorithm A, tokenization algorithm B, or the like) stored in a local storage device (e.g., memory 204, storage device 108, or the like) to generate the plurality of tokens. For example, memory 204 may store a character level tokenization algorithm, word level tokenization algorithm, or the like, such that contextual analysis engine 208 may utilize a particular tokenization algorithm to generate the plurality of tokens.

In some embodiments, contextual analysis engine 208 may select a particular tokenization algorithm based on a set of tokenization rules. In some embodiments, contextual analysis engine 208 may refer to the set of tokenization rules, which may describe particular conditions that when satisfied indicate a particular tokenization algorithm for the contextual analysis engine 208 to select to ultimately generate the plurality of tokens. In this regard, contextual analysis engine 208 may determine a set of electronic communication parameters from the electronic communication and compare the set of electronic communication parameters to the set of tokenization rules to determine and ultimately select a particular tokenization algorithm to use to generate the plurality of tokens. In some embodiments, the tokenization algorithms may remove extraneous characters, such as whitespaces, punctuation, and/or other special characters.

In some embodiments, the set of electronic communication parameters may describe particular characteristics about the electronic communication, such as an indication as to whether the electronic communication is an internal or external communication (e.g., an employee-to-employee interaction or employee to customer interaction), a time stamp associated with the electronic communication, the type of electronic communication, and/or the like. In some embodiments, contextual analysis engine 208 may utilize optical character recognition (OCR), natural language processing (NLP), searching algorithms, and/or the like, to determine the set of electronic communication parameters. For example, contextual analysis engine 208 may use NLP to identify the type of received electronic communication. As a result, contextual analysis engine 208 may search the metadata associated with the electronic communication, which may include an identifier to identify the type of received electronic communication. Contextual analysis engine 208 may then store the type of received electronic communication in the set of electronic communication parameters, which may be stored in a local storage device (e.g., memory 204, storage device 108, and/or the like).

As shown by operation 306, the apparatus 200 includes means, such as processor 202, memory 204, contextual analysis engine 208, or the like, for determining whether the electronic communication includes disallowed content. In some embodiments, disallowed content may be any content included an electronic communication that may expose an entity or one or more individuals to risk. For example, prohibited terminology, personal opinions, confidential information, instructions to direct the user to a non-monitored line of communication, and/or the like, may be disallowed content. In some embodiments, the entity that is evaluating the received electronic communication may describe what is to be considered disallowed content (e.g., personal identifiable information, personal opinions, and/or the like).

In some embodiments, the contextual analysis engine 208 may leverage a contextual analysis machine learning model to determine whether the electronic communication includes disallowed content. In some embodiments, the contextual analysis machine learning model is a trained machine learning model, such as a bidirectional encoder representations from transformers (BERT) model or a large language model (LLM). In this regard, the contextual analysis machine learning model may consider the context of a token's representative of the electronic communication when determining whether the electronic communication includes disallowed content.

In some embodiments, the contextual analysis machine learning model may be trained and/or fine-tuned to determine whether a token corresponds to disallowed content. In particular, the contextual analysis machine learning model may be trained and/or fine-tuned using a communication training corpus, which comprises a plurality of training electronic communications. In some embodiments, the communication training corpus is organized into two sets of training electronic communications. A first set may include unlabeled training electronic communications. In some embodiments, the first set of training electronic communications may only include electronic communications which do not include disallowed content. A second set of training electronic communications may include training electronic communications with labels or annotations indicative of whether the electronic communication contains disallowed content and if so, what the disallowed content is. In particular, in some embodiments, for each annotated electronic communication that includes disallowed content, the annotated training electronic communications may further comprise (i) an indication of one or more characters within a body of the annotated training electronic communications that correspond to the disallowed content and (ii) a rule associated with the disallowed content. The rule that is associated with the disallowed content may be a particular policy or guideline established by an entity that is evaluating electronic communication and using the content evaluation system 102. For example, the rule may be a particular industry guideline or standard regarding the use of personal identifiable information. In some embodiments, the annotations included in the plurality of annotated electronic communications may include highlighted characters that indicates the characters associated with the disallowed content. In addition, the particular highlight may indicate the rule associated with the disallowed content (e.g., the color of the highlight, such as a yellow highlight indicating a violation of an internal policy/guideline).

The second set of training electronic communications may include both electronic communications which do not include disallowed content and electronic communications that include disallowed content.

In some embodiments, the contextual analysis machine learning model may be trained in two phases. The first phase may be an unsupervised learning phase where the contextual analysis machine learning model is provided a plurality of unlabeled training electronic communications from the first set of data in the communication training corpus. For a given training electronic communication, the contextual analysis machine learning model may then randomly mask certain tokens and then apply a next sentence prediction. Thus, the contextual analysis machine learning model may use an unsupervised learning approach to predict a next term or phrase in a sentence. During a second phase, the contextual analysis machine learning model may use a supervised learning approach to fine-tune its parameters. Here, the contextual analysis machine learning model may be provided a plurality of labeled or annotated training electronic communications from the second set of data in the communication training corpus. In particular, the contextual analysis machine learning model may process the plurality of tokens for each annotated training electronic communication and further, may be provided with an indication of whether the corresponding electronic communications includes disallowed content. Furthermore, the contextual analysis machine learning model may be provided with an indication of what terms and/or tokens are associated with the disallowed content. In this manner, the contextual analysis machine learning model may be trained to recognize patterns within the electronic communications that may be indicative of whether certain tokens are associated with disallowed content without reliance on a particular term of phrase.

In some embodiments, the contextual analysis machine learning model may be trained by initializing a base model, such as a base LLM. The base model may then be provided labeled or annotated training electronic communications from the second set of data in the training corpus to fine-tune the base model. The final fine-tuned product of the base model may be the contextual analysis machine learning model.

In some embodiments, the plurality of annotated electronic communications may be received by communications hardware 206 from a computing device (e.g., user device 106A, user device 106N, or the like). For example, communications hardware 206 may receive, via a network, such as communications network 104, the annotated electronic communications from user device 106A. In some embodiments, upon receiving the plurality of annotated electronic communications, communications hardware 206 may store the annotated electronic communications in the second set of the communication training corpus, which may be stored and/or maintained in a local storage device (e.g., memory 204, storage device 108, or the like).

In some embodiments, training circuitry 210 may preprocess the plurality of annotated electronic communications (e.g., tokenizing the text, handling/removing special characters, and/or the like) before using the plurality of annotated electronic communications to train the contextual analysis machine learning model. Additionally, if needed, training circuitry 210 may format the included annotations into particular input features for training, such as binary labels indicating the presence or absence of disallowed content and character level tags that indicate the locations and type of disallowed content (e.g., violating an internal policy/guideline, violating an industry standard, or the like).

In some embodiments, training circuitry 210 may input the preprocessed plurality of annotated electronic correspondence into the contextual analysis machine learning model for training. As a result, the contextual analysis machine learning model may be adapted and trained to identify disallowed content using the plurality of annotated electronic communications. For example, assume the contextual analysis machine learning model is a BERT model that is initialized with pre-trained parameters (e.g., parameters capturing general linguistic patterns, semantic relationships present in text, or the like) obtained from training on large corpora of text data. Upon providing the plurality of annotated electronic communications to the BERT model, the BERT model may utilize the plurality of annotated electronic communications for fine-tuning (e.g., updating its parameters using the plurality of annotated electronic communications), such that the BERT model is trained to identify disallowed content in electronic communications. In some embodiments, the contextual analysis machine learning model may include additional layers and/or the output layer may be modified to identify disallowed content in electronic communications.

Turning now to FIG. 4, example operations are shown for determining whether the electronic communication includes disallowed content.

As shown by operation 402, the apparatus 200 includes means, such as memory 204, contextual analysis engine 208, or the like, for determining a corresponding context token embedding for each token included in the plurality of tokens. In some embodiments, contextual analysis engine 208 may leverage the contextual analysis machine learning model to determine the corresponding context token embedding for each token included in the plurality of tokens that were generated in operation 304. For example, contextual analysis engine 208 may provide the plurality of tokens to the contextual analysis machine learning model. Thereafter, the contextual analysis machine learning model may output a corresponding context token embedding for the tokens included in the plurality of tokens.

In some embodiments, the contextual analysis machine learning model (e.g., a model fine-tuned to determine whether there is disallowed content included in an electronic communication) may comprise of multiple transformer layers, each of which refines the context token embeddings, representative of the corresponding tokens, based on increasingly contextualized information from the input plurality of characters (e.g., the plurality of characters included in the body of the electronic communication as described above in relation to operation 302). For example, assume that "our branch is located by the river-bank" are the plurality of characters that are included in the received electronic communication. In this regard, the first context token embedding determined for the token "bank" may capture basic syntactic information (e.g., word identity). However, as the token for "bank" passes through subsequent transformer layers, the context token embedding for "bank" may include more contextual information that is derived from the surrounding tokens. Finally, the final transformer layer may output a corresponding context token embedding for "bank" that encapsulates semantic information about its role in the sentence, such as its subject-object relationship with other tokens.

Additionally, the multiple transformer layers may include self-attention mechanisms. The self-attention mechanisms enable the contextual analysis machine learning model to focus on different parts of the input plurality of characters while determining a corresponding context token embedding for each token included in the plurality of tokens. Said another way, the self-attention mechanisms enable the contextual analysis machine learning model to capture dependencies between tokens and incorporate contextual information into their respective embedding's. For instance, continuing the above example where the input plurality of characters is "our branch is located by the river-bank," the token "bank" may have different meanings depending on its context. As such, during self-attention, the contextual analysis model may dynamically assign different weights to other tokens in the input sequence based on how they are associated to the token "bank". In this example, the token "bank" could be associated with a financial institution or the land at the edge of a river. Since the token "bank" is not surrounded by tokens associated with a financial institution (e.g., money, loan, finance, and/or the like), but rather the token "river", the contextual analysis machine learning model may assign a higher weight to the token "river", indicating the token's semantic relevance to the context of the token "bank."

As shown by operation 404, the apparatus 200 includes means, such as memory 204, contextual analysis engine 208, or the like, for determining an infraction token probability score associated with each token based on the corresponding context token embedding. In some embodiments, the infraction token probability score may be a numerical score (e.g., a score between 0 and 1) that is indicative of the probability that a particular token corresponds to disallowed content.

In some embodiments, contextual analysis engine 208 may leverage the contextual analysis machine learning model to determine the infraction token probability score. For instance, the final layer of the contextual analysis machine learning model may ultimately produce raw scores (e.g., logits) for each token included in the plurality of tokens. Subsequently, a SoftMax function may be applied to normalize the produced raw scores into probabilities. For example, the SoftMax function may exponentiate each score and then divide each exponentiated score by the sum of all exponentiated scores. As a result, the SoftMax function may produce a positive infraction token probability score between the values of 0 and 1.

As shown by operation 406, the apparatus 200 includes means, such as memory 204, contextual analysis engine 208, or the like, for determining the token that corresponds to disallowed content. In some embodiments, contextual analysis engine 208 may leverage the contextual analysis machine learning model to determine that a token included in the plurality of tokens that corresponds to disallowed content. To do so, each infraction token probability score produced by the SoftMax function in operation 404 may be compared to an infraction token probability score threshold to determine whether a token corresponds to disallowed content. By continuing the above example where the infraction token probability score determined by the SoftMax function is a numerical score between 0 and 1, the infraction token probability score may be required to satisfy an infraction token probability score threshold (e.g., 0.82) to determine that the received electronic communication includes disallowed content.

In some embodiments the infraction token probability score threshold may be a learned during training of the contextual analysis model. Additionally, the infraction token probability score threshold may be adjusted based on the set of electronic communication parameters associated with the received electronic communication. For example, contextual analysis engine 208 may input the set of electronic communication parameters into the contextual analysis machine learning model, such that the contextual analysis machine learning model may utilize the set of electronic communication parameters to modify the infraction token probability score threshold before determining whether the token corresponds to disallowed content. For example, the contextual analysis machine learning model may modify the infraction token probability score threshold if the set of electronic communication infraction token parameters indicate that the electronic communication is an internal electronic communication (e.g., an employee-to-employee electronic communication). Additionally, the contextual analysis machine learning model may modify the infraction token probability score threshold in response to a plurality of electronic communication parameters included in the set of electronic communication parameters. For example, the contextual analysis machine learning model may retrieve a set of threshold modification rules from a local storage device (e.g., memory 204, storage device 108, or the like) that describe how to modify the infraction token probability score threshold in light of each electronic communication parameter included in the set of electronic communication parameters.

Finally, as shown by operation 408, the apparatus 200 includes means, such as memory 204, contextual analysis engine 208, or the like, for determining whether the electronic communication includes disallowed content based on the plurality of tokens. In particular, in some embodiments the contextual analysis engine 208 may use the contextual analysis machine learning model to make this determination. The contextual analysis machine learning model may determine the electronic communication includes disallowed content in an instance in which a token is determined to correspond to disallowed content, as determined in operation 408. If no token of the plurality of tokens is determined to correspond to disallowed content, the contextual analysis machine learning model may determine the electronic communication does not include disallowed content. This determination by the contextual analysis machine learning model may be output to the contextual analysis engine 208. Furthermore, in an instance in which contextual analysis machine learning model determines the electronic communication includes disallowed content, the contextual analysis machine learning model may further output an indication of the characters which correspond to the disallowed content.

Returning to FIG. 3, as shown by operation 308, the apparatus 200 includes means, such as processor 202, memory 204, contextual analysis engine 208, or the like, for determining whether the electronic communication includes disallowed content. As described above, the contextual analysis engine 208 may determine whether the electronic communication includes disallowed content. In particular, in some embodiments, the contextual analysis engine 208 leverage the contextual analysis machine learning model to provide a determination as to whether the electronic communication includes disallowed content.

In an instance in which the contextual analysis engine 208 determines the electronic communication does not include disallowed content, the process may proceed to operation 310. As shown by operation 310, the apparatus 200 includes means, such as processor, 202, memory 204, communications hardware 206, contextual analysis engine 208, or the like, for providing the electronic communication. In some embodiments, if none of the plurality of tokens satisfy the infraction token probability score threshold, the contextual analysis engine 208 may allow to the electronic communication to be provided to its intended recipient. The recipient may be the intended recipient for the electronic communication. In some embodiments, contextual analysis engine 208 may determine the corresponding recipient by retrieving the set of electronic communication parameters associated with the electronic communication from a local storage device (e.g., memory 204, storage device 108, or the like). Thereafter, communications hardware 206 may provide the updated electronic communication to a corresponding recipient by transmitting the updated electronic communication via a network (e.g., communications network 104, shown in FIG. 1) to a corresponding computing device associated with the recipient (e.g., user device 106N, or the like). In embodiments in which the electronic communication is being evaluated for disallowed content in real-time (e.g., prior to provision of the electronic communication to the recipient), the contextual analysis engine 208 may allow the electronic communication to be provided to the recipient upon request by the user.

In an instance in which the contextual analysis engine 208 determines the electronic communication includes disallowed content, the process may proceed to operation 312. As shown by operation 312, the apparatus 200 includes means, such as processor 202, memory 204, contextual analysis engine 208, or the like, for determining an infraction event. The infraction event may refer to a category associated with any token included in the electronic communication (e.g., the electronic communication received in operation 302) that corresponds to disallowed content. In some embodiments, an infraction event may correspond to an infraction event type, which may correspond to the disallowed content to which the infraction token corresponds. In some embodiments, the infraction event type may be associated with and/or indicate the severity of the infraction event. In particular, an infraction event type may be considered severe, moderate, low, or the like, based on the infraction token probability score associated with the token that corresponds to disallowed content. For example, assume the infraction token was a token that comprised a social security number (e.g., "XXX-XX-XXXX") and that the corresponding token for the social security number is considered disallowed content because the contextual analysis machine learning model produced an infraction token probability score of 0.98, which satisfied an infraction token probability score threshold of 0.74. In some embodiments, the contextual analysis machine learning model may have been further trained to classify a particular token that corresponds to disallowed content as a particular infraction event type.

As shown by operation 314, the apparatus 200 includes means, such as processor 202, memory 204, contextual analysis engine 208, or the like, for determining an infraction alleviation action. In some embodiments, the infraction alleviation action may describe any real-world action that may be performed to resolve the infraction event (e.g., cause removal of the infraction event). For example, an infraction alleviation action may include the transmission of a request to the author of the electronic communication to resolve the infraction event by providing an updated plurality of characters, or the like.

In some embodiments, the infraction alleviation action may be associated with the infraction event type. For example, a severe infraction event type may be associated with the transmission of a message to the superior of the author of the electronic communication. To this end, a local storage device (e.g., memory 204, storage device 108, and/or the like) may comprise of a database that includes one or more infraction alleviation actions that are associated with a particular infraction event type. For example, the database storing the infraction alleviation action may store the infraction alleviation actions and the infraction event type in the form of key-value pairs, where the key portion specifies the infraction event type, and the value portion specifies the infraction alleviation action. Thus, contextual analysis engine 208 may search for a particular infraction event type, which may be a key that is associated with a particular infraction event type.

As shown by operation 316, the apparatus 200 includes means, such as processor 202, memory 204, communications hardware 206, contextual analysis engine 208, or the like, for causing performance of the infraction alleviation action. In some embodiments, the performance of the infraction alleviation action may be caused in response to the occurrence of an infraction alleviation action automatic triggering event. An infraction alleviation action automatic triggering event may include a circumstantial trigger event, and/or the like. A circumstantial trigger event may take place based on rules and/or configurations predefined by the entity that is providing the evaluation of content included in an electronic communication that requires the performance of an infraction alleviation action in response to the determination of the infraction event type. For example, contextual analysis engine 208 may configure a circumstantial trigger that causes communications hardware 206 to transmit a message to the manager of the author of the received electronic communication in response to the determination of a severe infraction event type. In some embodiments, the transmitted message to the manager may comprise of the electronic communication, the infraction event type, an indication of the characters included in the plurality of characters that correspond to the infraction token, and/or the like. In another example, a circumstantial trigger may be configured to cause communications hardware 206 to transmit a message to the author of the received electronic communication in response to a moderate infraction event type. An example GUI of a message transmitted to the author of the received electronic communication is shown in FIG. 6.

In some embodiments, an automatic trigger may cause the transmission of a request (e.g., an infraction alleviation request) to the user associated with the electronic communication to resolve the infraction event. Turning next to FIG. 5, example operations are shown for requesting and receiving an updated token to resolve the infraction event.

As shown by operation 502, the apparatus 200 includes means, such as processor 202, memory 204, communications hardware 206, contextual analysis engine 208, or the like, for providing an infraction alleviation request to a user device. To do so, contextual analysis engine 208 may retrieve the set of electronic communication parameters from a local storage device (e.g., memory 204, storage device 108, and/or the like), which may indicate the user, such as an identifier of the user that authored the electronic communication (e.g., an email address). For example, assume the electronic communication is an email. In this regard, the set of electronic communication parameters may include the email address associated with the user that authored the electronic communication. Thereafter, contextual analysis engine 208 may retrieve from a local storage device, a user device dataset that indicates a user device, such as user device 106A, and a corresponding user identifier (e.g., an email address). Contextual analysis engine 208 may then leverage communications hardware 206 to ultimately provide the infraction alleviation request to the user associated with the electronic communication. For example, communications hardware 206 may transmit the infraction alleviation request to user device 106A via a network (e.g., communications network 104, shown in FIG. 1), such that the infraction alleviation request is provided to the user that authored the electronic communication.

In some embodiments, the infraction alleviation request may be an electronic request that includes an indication of one or more characters included in the plurality of characters included in the body of the electronic communication that are associated with the disallowed content. For example, the infraction alleviation request may comprise of a highlight or any other indicator that indicates the plurality of characters that correspond to disallowed content (e.g., the infraction token). Additionally, the infraction alleviation request may include a message that prompts the user to update the electronic communication and provide an updated electronic communication to the apparatus 200 (e.g., communications hardware 206). For example, the message may indicate the infraction event type, any other infraction alleviation actions that have been performed (e.g., notifying the user's manager), and/or the like. In some embodiments, the requested update to the electronic communication may be a request for the user to transmit an updated electronic communication, such that the updated electronic communication replaces or removes the one or more characters that are indicated to be associated with the disallowed content.

As shown by operation 504, the apparatus 200 includes means, such as processor 202, memory 204, communications hardware 206, or the like, for receiving an updated electronic communication. In some embodiments, the updated electronic communication may be an electronic communication that is received from a user in response to providing the infraction alleviation request to the user. In some embodiments, the updated electronic communication may include an updated plurality of characters in the body of the updated electronic communication. The updated plurality of characters may be a variety of numbers, letters, symbols, punctuation marks, white space, and/or the like. The updated plurality of characters may include at least one character that is different from the plurality of characters included in the body of the electronic communication received in operation 302, such that the updated plurality of characters may potentially replace the token that was determined to correspond to disallowed content in operation 406.

In some embodiments, the updated electronic communication may be received from a computing device associated with a user (e.g., user device 106A-106N, or the like). For example, the apparatus 200 (e.g., communications hardware 206) may receive the updated electronic communication via a network (e.g., communications network 104, shown in FIG. 1) and from a user device associated with the user that authored the electronic communication (e.g., user device 106A, user device 106N, or the like). In some embodiments, the updated communication may be received from the same computing device that received the infraction alleviation request described above in relation to operation 502. Additionally or alternatively, the updated electronic communication may be received from a different computing device than the computing device that received the infraction alleviation request. In some embodiments, upon receiving the updated communication, the apparatus 200 (e.g., contextual analysis engine 208, or the like) may store the received updated communication in a local storage device (e.g., memory 204, storage device 108, or the like).

In some embodiments, contextual analysis engine 208 may leverage the contextual analysis machine learning model to determine a set of updated electronic communication parameters associated with the updated electronic communication. The set of updated electronic communication parameters may describe a set of characteristics associated with the updated electronic communication. For example, the set of updated electronic communication parameters may describe if the electronic communication is internal or external, the time the electronic communication was received and/or transmitted, the intended recipient, the electronic communication type (e.g., email, chat message, social media post, and/or the like), the number of intended recipients, and/or the like.

In some embodiments, contextual analysis engine 208 may utilize a variety of different techniques to determine the set of updated electronic communication parameters. For example, contextual analysis engine 208 may retrieve the updated electronic communication from a local storage device (e.g., memory 204, storage device 108, or the like) and subsequently identify any electronic communication parameters from the metadata associated with the electronic communication. By means of continuing example, contextual analysis engine 208 may identify a header associated with the electronic communication and subsequently parse the different fields associated with the header, such as a from field, to field, date field, and/or the like, to identify the set of updated electronic communication parameters. For example, contextual analysis engine 208 may use OCR, NLP, searching algorithms, and/or the like, to identify particular characteristics (a date, recipient, or the like) associated with the electronic communication. Upon identifying the particular parameters included in the set of updated electronic communication parameters, contextual analysis engine 208 may retrieve a set of electronic communication parameter rules that describe rules and/or conditions that must be satisfied to determine a particular electronic communication parameter included in the set of electronic communication parameters. For example, the set of electronic communication rules may describe a particular email address as an internal email address. As such, if a particular parameter determined by contextual analysis engine 208 indicates that the recipient in the "to" field includes an internal email address, the set of updated electronic communication parameters may include an indication that the updated electronic correspondence is an internal email.

As shown by operation 506, the apparatus 200 includes means, such as processor 202, memory 204, communications hardware 206, contextual analysis engine 208, or the like, for generating a plurality of updated tokens. In some embodiments, the plurality of updated tokens may be generated based on the plurality of updated plurality of characters included in the updated electronic communication. In some embodiments, contextual analysis engine 208 may select a tokenizing algorithm from a plurality of tokenizing algorithms (e.g., tokenizing algorithm A, tokenizing algorithm B, or the like) stored in a local storage device (e.g., memory 204, storage device 108, or the like) to generate the plurality of updated tokens. For example, memory 204 may store a character level tokenization algorithm, word level tokenizing algorithm, or the like, such that contextual analysis engine 208 may retrieve a particular tokenizing algorithm to generate the plurality of tokens. In some embodiments, generating the updated plurality of tokens may be performed in a substantially similar manner to generating the tokens as described in operation 304 of FIG. 3.

In some embodiments, contextual analysis engine 208 may select a particular tokenizing algorithm based on the type of received updated electronic communication (e.g., email, instant message, or the like). For example, contextual analysis engine 208 may retrieve from a local storage device (e.g., memory 204, storage device 108, or the like) a set of tokenization rules that describes a particular tokenization algorithm to utilize based on the type of received updated electronic communication. By means of continuing example, assume the type of updated electronic communication is an email. In this regard, contextual analysis engine 208 may identify that the updated electronic communication is an email (e.g., contextual analysis engine 208 may determine the type of updated electronic communication by searching the updates set of electronic communication parameters for the type of updated electronic communication) and then subsequently retrieve the set of tokenization rules from memory 204, which indicate a particular tokenization algorithm to utilize for a particular type of updated electronic communication. Additionally or alternatively, contextual analysis engine 208 may use any suitable technique (e.g., OCR, NLP, searching algorithms, machine learning models, and/or the like) to identify the type of updated electronic communication. For instance, contextual analysis engine 208 may search the metadata associated with the updated electronic communication, which may include an identifier to identify the type of updated electronic communication. Upon identification of the type of updated electronic communication, contextual analysis engine 208 may retrieve the set of tokenization rules from a local storage device to determine the tokenizing algorithm associated with the type of electronic communication, and subsequently apply the tokenization algorithm to the plurality of characters included in the body of the electronic communication.

As shown by operation 508, the apparatus 200 includes means, such as processor 202, memory 204, communications hardware 206, contextual analysis engine 208, or the like, for determining whether the updated electronic communication incudes disallowed content. In some embodiments, contextual analysis engine 208 may leverage the contextual analysis machine learning model to determine whether the updated electronic communication incudes disallowed content or no longer includes disallowed content. In particular the contextual analysis engine 208 may leverage the contextual analysis machine learning model to determine a corresponding updated context token embedding for each updated token included in the plurality of updated tokens. For example, contextual analysis engine 208 may retrieve the generated plurality of updated tokens and provide the retrieved plurality of updated tokens and the updated electronic communication to the contextual analysis machine learning model. In some embodiments, determining whether the updated electronic communication includes disallowed content may be performed in a substantially similar manner to determining whether the electronic communication includes disallowed content as described in operation 306 of FIG. 3 and the operations described by FIG. 4.

In some embodiments, the plurality of updated tokens may be used to generate context token embeddings for each updated token. The plurality of updated tokens may be input into the contextual analysis machine learning model, such that the contextual analysis machine learning model, which may ultimately generate a corresponding updated context token embedding for each token included in the plurality of updated tokens. The updated context token embedding for each token may be similarly determined as described in relation to operation 402 of FIG. 4.

In some embodiments, the contextual analysis engine 208 may further determine an updated infraction token probability score associated with each token based on the corresponding updated context token embedding. In some embodiments, an updated infraction token probability score may be a numerical score (e.g., a score between 0 and 1) that is indicative of the probability that a particular updated token corresponds to disallowed content. In some embodiments, as described above in relation to operation 404 of FIG. 4, the contextual analysis machine learning model may comprise a SoftMax function that ultimately outputs the infraction token probability score based on the features learned during training.

In some embodiments, the updated infraction token probability score produced by the SoftMax function may be compared to the infraction token probability score threshold associated with the infraction event to determine whether an updated token corresponds to disallowed content. For example, assume the updated infraction token probability score determined by the contextual analysis model is a numerical score between 0 and 1. As a result, the updated infraction token probability score may be required to satisfy an infraction token probability score threshold of 0.82 to determine whether the updated electronic communication includes disallowed content.

In an instance in which the contextual analysis engine 208 determines the updated electronic communication includes disallowed content, the process may proceed to operation 510. As shown by operation 510, the apparatus 200 includes means, such as processor 202, memory 204, contextual analysis engine 208, or the like, for updating the infraction event. However, the infraction event type may be updated as needed. In some embodiments, if the updated infraction token probability score does not satisfy the infraction token probability score threshold that is associated with the infraction event, contextual analysis engine 208 may maintain the infraction event, such that the updated electronic communication that includes a plurality of updated plurality of characters is not transmitted to its corresponding recipient. In some embodiments, the procedure may proceed back to operation 502, such that a new infraction alleviation event may be provided to a user device to request the user associated with the user device to potentially transmit an updated electronic communication that may result in the removal of the infraction event.

As shown by operation 512, the apparatus 200 includes means, such as processor 202, memory 204, contextual analysis engine 208, or the like, for removing the infraction event. In some embodiments, the infraction event may be removed if the updated electronic communication is determined to no longer includes disallowed content and only includes allowed content (e.g., if the updated token included in the plurality of updated tokens corresponds to allowed content). Allowed content may correspond to any content included in the plurality of updated tokens that does not correspond to disallowed content, such that the allowed content is permitted to be provided to the corresponding recipient associated with the updated electronic communication. In some embodiments, if the updated infraction token probability score satisfies the infraction token probability score threshold, contextual analysis engine 208 may determine the updated token corresponds to allowed content and may then remove the infraction event. As such, removal of the infraction event may enable communications hardware 206 to proceed with providing the updated electronic communication, which now only include allowed content to its corresponding recipient as described further below in relation to operation 514.

Finally, as shown by operation 514, the apparatus 200 includes means, such as processor 202, memory 204, communications hardware 206, contextual analysis engine 208, or the like, for providing the electronic communication to a corresponding recipient. The corresponding recipient may be the intended recipient for the updated electronic communication. In some embodiments, contextual analysis engine 208 may retrieve the corresponding recipient associated with the updated electronic communication from the set of updated electronic communication parameters from a local storage device (e.g., memory 204, storage device 108, or the like). Thereafter, communications hardware 206 may provide the updated electronic communication to a corresponding recipient by transmitting the updated electronic communication via a network (e.g., communications network 104, shown in FIG. 1).

FIGS. 3-5 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example System Interaction

Turning to FIG. 6, a graphical user interface (GUI) is provided that illustrates an example presentation of a message on a computing device (e.g., user device 106A, or the like). As noted previously in operation 316, contextual analysis engine 208 may cause communications hardware 206 to transmit a message to the author of a received electronic communication that includes disallowed content. In such an embodiment, the GUI shown in FIG. 6 may be displayed to the user by a computing device, such as any of user devices 106A-106N associated with the user.

Summary 602 may be automatically displayed on a computing device associated with the user. Alternatively, summary 602 may be displayed in response to a user interacting with the transmitted message. For example, the full text included in summary 602 may be displayed if a user hovers a cursor over the bolded and underlined text "Summary". A visual indicator, such as summary 602 blinking, may prompt the user to click or otherwise interact with summary 602 to reveal a detailed summary. Similarly, disallowed content 604 may be automatically displayed or disallowed content 604 may be displayed in response to a user interacting with the transmitted message, such as hovering over the bolded and underlined text. In addition, a visual indicator, such as disallowed content 604 blinking, may prompt a user to hover a curser or click the bolded and underlined text. Lastly, icon 606 may blink or comprise text that instructs the user to interact with the icon to revise the electronic communication that comprises disallowed content. For example, user interaction (e.g., clicking the icon) with icon 606 may cause the user to open an attachment that comprises the electronic communication that includes the disallowed content.

CONCLUSION

As described above, example embodiments provide methods and apparatuses that enable an improved ability to evaluate content in an electronic communication to determine whether the electronic communication includes disallowed content. Example embodiments thus provide tools that overcome the problems faced by rules-based and manual electronic communication content evaluation techniques. By avoiding the need to manually perform evaluations of electronic correspondence, example embodiments thus save time and resources, while also eliminating the possibility of human error that has been unavoidable in the past. Moreover, by automating functionality that has historically required human analysis, the speed and consistency of the evaluations performed by example embodiments unlocks new functions that have historically not been available, such as the ability to conduct near-real time evaluations of electronic correspondence. Finally, embodiments described herein avoid the various drawbacks associated with utilizing rules-based models to evaluate content in electronic correspondence by utilizing a contextual analysis machine learning model that considers the semantic meaning of terminology, phrases, and/or other content in an electronic communication to determine whether the electronic communication includes disallowed content.

As these examples all illustrate, example embodiments contemplated herein provide technical solutions that solve real-world problems faced while evaluating electronic communications for disallowed content. And while determining whether an electronic communication includes disallowed content has been an issue for decades, the recently exploding amount of data made available by recently emerging technology today has made this problem significantly more acute, as the demand for evaluating electronic communications has grown significantly, more and more areas of society leverage electronic communications for communication, so the need to ensure those electronic communications do not include disallowed content is growing substantially, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for evaluating an electronic communication, the method comprising:

receiving, by communications hardware, the electronic communication, wherein a body of the electronic communication comprises a plurality of characters;

generating, by a contextual analysis engine and based on the plurality of characters, a plurality of tokens;

determining, by the contextual analysis engine and using a contextual analysis machine learning model, an infraction token probability score for a token of the plurality of tokens, wherein (a) the infraction token probability score for the token is determined based on semantic information about the token's role in a sentence derived from a surrounding token, (b) the infraction token probability score indicates a probability that the token corresponds to disallowed content, and (c) the disallowed content is associated with a rule;

determining, by the contextual analysis engine and using the contextual analysis machine learning model, whether the electronic communication includes the disallowed content based on the infraction token probability score for the token;

in response to determining that the electronic communication includes the disallowed content, determining, by the contextual analysis engine and using the contextual analysis machine learning model, an infraction event, wherein the infraction event corresponds to an infraction event type and the infraction event type is based on the disallowed content included in the electronic communication;

determining, by the contextual analysis engine and based on the infraction event type, an infraction alleviation action; and causing, by the contextual analysis engine, performance of the infraction alleviation action.

2. The method of claim 1, further comprises:

receiving, by the communications hardware, a plurality of annotated electronic communications, wherein (a) each annotated electronic communication comprises an indication of whether an annotated electronic communication includes disallowed content and (b) in an instance in which the annotated electronic communication includes disallowed content, the annotated electronic communication further comprises (i) an indication of one or more characters within a body of the annotated electronic communication that correspond to the disallowed content and (ii) a rule associated with the disallowed content; and training, by training circuitry, the contextual analysis machine learning model using the plurality of annotated electronic communications.

3. The method of claim 1, further comprising:

determining, by the contextual analysis engine and using the contextual analysis machine learning model, a corresponding context token embedding for each token included in the plurality of tokens;

determining, by the contextual analysis engine using the contextual analysis machine learning model, an infraction token probability score associated with each token based on the corresponding context token embedding;

in an instance in which the infraction token probability score satisfies an infraction token probability score threshold, determining, by the contextual analysis engine using the contextual analysis machine learning model, the token corresponds to disallowed content; and in an instance in which the token corresponds to disallowed content, determining, by the contextual analysis engine and using the contextual analysis machine learning model, the electronic communication includes disallowed content.

4. The method of claim 1, further comprising:

determining, by the contextual analysis engine using the contextual analysis machine learning model, a set of electronic communication parameters from the electronic communication, wherein determining whether the electronic communication includes disallowed content is further based on the set of electronic communication parameters.

5. The method of claim 1, wherein performing the infraction alleviation action comprises:

providing, by the communications hardware, an infraction alleviation request to a user device, and wherein the infraction alleviation request indicates one or more characters in the body of the electronic communication that are associated with the disallowed content.

6. The method of claim 5, further comprising:

receiving, by the communications hardware and from the user device, an updated electronic communication, wherein the updated electronic communication comprises an updated plurality of characters and the updated plurality of characters include at least one character that is different from the plurality of characters;

generating, by the contextual analysis engine and based on the updated plurality of characters, a plurality of updated tokens;

determining, by the contextual analysis engine and using the contextual analysis machine learning model, whether the updated electronic communication includes disallowed content; and in an instance in which the updated electronic communication is determined to include disallowed content, maintaining, by the contextual analysis engine and using the contextual analysis machine learning model, the infraction event.

7. The method of claim 6, further comprising:

in an instance in which the updated electronic communication is determined to no longer include disallowed content, removing, by the contextual analysis engine, the infraction event; and providing, by the communications hardware, the electronic communication to a corresponding recipient.

8. The method of claim 1, wherein the contextual analysis machine learning model is a bidirectional encoder representations from transformers (BERT) model or a large language model (LLM).

9. An apparatus for evaluating an electronic communication, the apparatus comprising:

communications hardware configured to receive the electronic communication, wherein a body of the electronic communication comprises a plurality of characters; and a contextual analysis engine configured to:

generate, based on the plurality of characters, a plurality of tokens, determine, using a contextual analysis machine learning model, an infraction token probability score for a token of the plurality of tokens, wherein (a) the infraction token probability score for the token is determined based on semantic information about the token's role in a sentence derived from a surrounding token, (b) the infraction token probability score indicates a probability that the token corresponds to disallowed content, and (c) the disallowed content is associated with a rule;

determine, using the contextual analysis machine learning model, whether the electronic communication includes the disallowed content based on the infraction token probability score for the token, in response to determining that the electronic communication includes the disallowed content, determine, using the contextual analysis machine learning model, an infraction event, wherein the infraction event corresponds to an infraction event type and the infraction event type is based on the disallowed content included in the electronic communication, determine, based on the infraction event type, an infraction alleviation action, and cause performance of the infraction alleviation action.

10. The apparatus of claim 9, wherein the communications hardware is further configured to:

receive a plurality of annotated electronic communications, wherein (a) each annotated electronic communication comprises an indication of whether an annotated electronic communication includes disallowed content and (b) in an instance in which the annotated electronic communication includes disallowed content, the annotated electronic communication further comprises (i) an indication of one or more characters within a body of the annotated electronic communication that correspond to the disallowed content and (ii) a rule associated with the disallowed content; and training circuitry configured to train the contextual analysis machine learning model using the plurality of annotated electronic communications.

11. The apparatus of claim 9, wherein the contextual analysis engine is further configured to:

determine, using the contextual analysis machine learning model, a corresponding context token embedding for each token included in the plurality of tokens;

determine, using the contextual analysis machine learning model, an infraction token probability score associated with each token based on the corresponding context token embedding;

in an instance in which the infraction token probability score satisfies an infraction token probability score threshold, determine, using the contextual analysis machine learning model, the token corresponds to disallowed content; and in an instance in which the token corresponds to disallowed content, determine, using the contextual analysis machine learning model, the electronic communication includes disallowed content.

12. The apparatus of claim 9, wherein the contextual analysis engine is further configured to:

provide an infraction alleviation request to a user device, wherein the infraction alleviation request indicates one or more characters in the body of the electronic communication that are associated with the disallowed content.

13. The apparatus of claim 12, wherein the communications hardware is further configured to:

receive, from the user device, an updated electronic communication, wherein the updated electronic communication comprises an updated plurality of characters and the updated plurality of characters include at least one character that is different from the plurality of characters; and the contextual analysis engine further configured to:

generate, based on the updated plurality of characters, a plurality of updated tokens, determine, using the contextual analysis machine learning model, whether the updated electronic communication includes disallowed content, and in an instance in which the updated electronic communication is determined to include disallowed content, maintain, using the contextual analysis machine learning model, the infraction event.

14. The apparatus of claim 13, wherein the contextual analysis engine is further configured to:

in an instance in which the updated electronic communication is determined to no longer include disallowed content, remove, using the contextual analysis machine learning model, the infraction event; and the communications hardware further configured to:

provide the electronic communication to a corresponding recipient.

15. A computer program product for evaluating an electronic communication, the computer program product comprising a non-transitory computer-readable storage medium storing instructions that, when executed by an apparatus, cause the apparatus to:

receive the electronic communication, wherein a body of the electronic communication comprises a plurality of characters;

generate, based on the plurality of characters, a plurality of tokens;

determine, using a contextual analysis machine learning model, an infraction token probability score for a token of the plurality of tokens, wherein (a) the infraction token probability score for the token is determined based on semantic information about the token's role in a sentence derived from a surrounding token, (b) the infraction token probability score indicates a probability that the token corresponds to disallowed content, and (c) the disallowed content is associated with a rule;

determine, using the contextual analysis machine learning model, whether the electronic communication includes the disallowed content based on the infraction token probability score for the token;

in response to determining that the electronic communication includes the disallowed content, determine, using the contextual analysis machine learning model, an infraction event, wherein the infraction event corresponds to an infraction event type and the infraction event type is based on the disallowed content included in the electronic communication;

determine, based on the infraction event type, an infraction alleviation action; and cause performance of the infraction alleviation action.

16. The computer program product of claim 15, wherein the instructions, when executed by the apparatus, further cause the apparatus to:

receive a plurality of annotated electronic communications, wherein (a) each annotated electronic communication comprises an indication of whether an annotated electronic communication includes disallowed content and (b) in an instance in which the annotated electronic communication includes disallowed content, the annotated electronic communication further comprises (i) an indication of one or more characters within a body of the annotated electronic communication that correspond to the disallowed content and (ii) a rule associated with the disallowed content; and train the contextual analysis machine learning model using the plurality of annotated electronic communications.

17. The computer program product of claim 15, wherein the instructions, when executed by the apparatus, further cause the apparatus to:

determine, using the contextual analysis machine learning model, a corresponding context token embedding for each token included in the plurality of tokens;

determine, using the contextual analysis machine learning model, an infraction token probability score associated with each token based on the corresponding context token embedding;

in an instance in which the infraction token probability score satisfies an infraction token probability score threshold, determine, using the contextual analysis machine learning model, the token corresponds to disallowed content; and in an instance in which the token corresponds to disallowed content, determine, using the contextual analysis machine learning model, the electronic communication includes disallowed content.

18. The computer program product of claim 15, wherein the instructions, when executed by the apparatus, further cause the apparatus to:

provide an infraction alleviation request to a user device, wherein the infraction alleviation request indicates one or more characters in the body of the electronic communication that are associated with the disallowed content.

19. The computer program product of claim 18, wherein the instructions, when executed by the apparatus, further cause the apparatus to:

receive, from the user device, an updated electronic communication, wherein the updated electronic communication comprises an updated plurality of characters and the updated plurality of characters include at least one character that is different from the plurality of characters;

generate, based on the updated plurality of characters, a plurality of updated tokens, determine, using the contextual analysis machine learning model, whether the updated electronic communication includes disallowed content, and in an instance in which the updated electronic communication is determined to include disallowed content, maintain, using the contextual analysis machine learning model, the infraction event.

20. The computer program product of claim 19, wherein the instructions, when executed by the apparatus, further cause the apparatus to:

in an instance in which the updated electronic communication is determined to no longer include disallowed content, remove, using the contextual analysis machine learning model, the infraction event; and provide the electronic communication to a corresponding recipient.

* * * * *